Oct. 5, 1965 SOTA YAMAMOTO 3,209,606
FRICTION TYPE CONTINUOUS SPEED VARIATION DEVICE
Filed Sept. 16, 1963 2 Sheets-Sheet 1

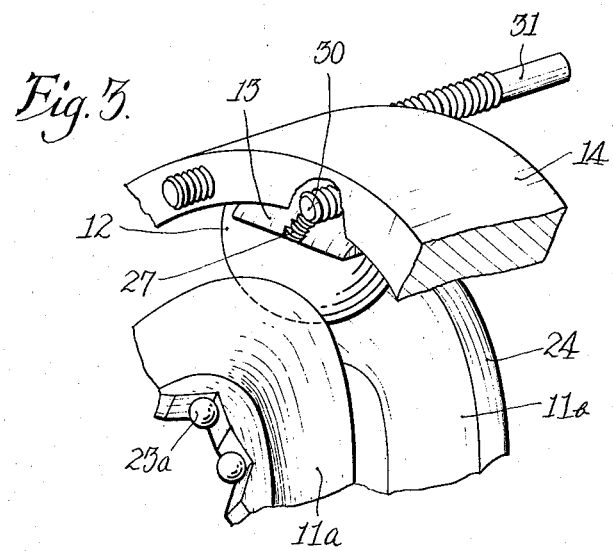
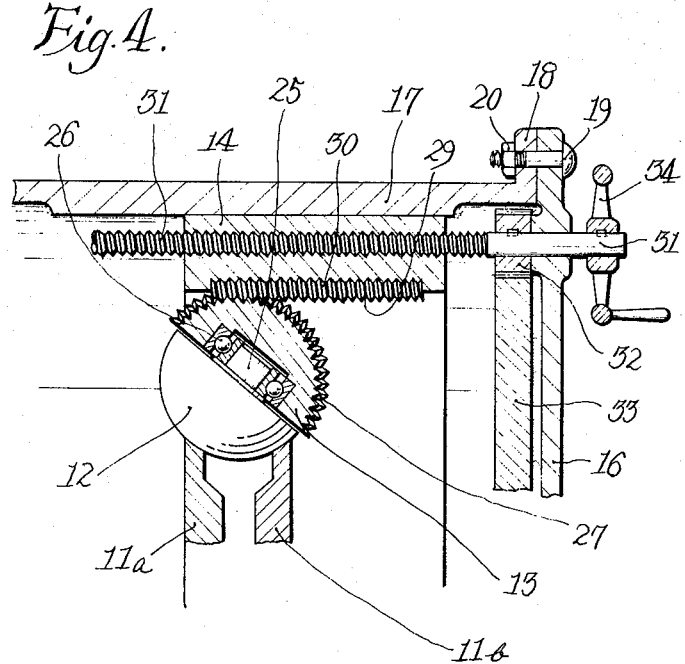

United States Patent Office 3,209,606
Patented Oct. 5, 1965

3,209,606
FRICTION TYPE CONTINUOUS SPEED
VARIATION DEVICE
Sota Yamamoto, 17–813 Ko Oaza Tendo Tendo-shi,
Yamagata-ken, Japan
Filed Sept. 16, 1963, Ser. No. 309,270
Claims priority, application Japan, Sept. 20, 1962,
37/54,425
5 Claims. (Cl. 74—200)

This invention relates to an improvement of a friction type continuous speed variation device. More particularly, this invention is concerned with a friction type continuous speed variation device wherein rotation of the driving shaft may be continuously varied and transmitted to the driven shaft by tilting the shaft of a hemispherical idler, the peripheral surface of which is adapted to rotate in simultaneous contact with the driving friction wheel and driven wheel confronting each other. In the said device, for the purpose of minimizing the size and simplifying the assembly work, the shaft of the hemispherical idler is supported by a rocking holder which works simultaneously as a mechanism for tilting and rocking said shaft and, further as a mechanism for press-contacting said hemispherical idler against the friction wheels.

A device is widely known wherein the driving shaft and driven shaft are journaled with each end abutting each other, a pair of friction wheels having a coned portion as the transmission surface being installed at the shaft ends confronting each other, and a plurality of hemispherical idlers, the peripheral surface of which contacts simultaneously with a pair of friction wheels and rotates, being installed in the middle of said pair of friction wheels, the contacting periphery of the hemispherical idler against both friction wheels being varied by properly tilting the shaft of the hemispherical idler, thus varying the transmission to the driven shaft.

It is necessary that, under the condition that the rotating shaft can freely tilt and rock, the hemispherical idler is always press-contacted against both friction wheels.

Besides, it is also necessary that the rotating shaft which can tilt and rock in such manner can be freely operated for tilting and rocking from outside of the frame of the device which comprises side walls and a surrounding wall and inside of which all the components of this device are accommodated, and, further, can be kept in a position tilted in any angle.

For this purpose, the prior devices have been of the following construction. That is, a holder which journals a hemispherical idler is journaled by a holding shaft against the frame of the device in such a manner that it can rotate freely in a tilted state; the holder is held by its holding axis so that the hemispherical idler held by its holding axis may be contacted by pressing force to a pair of friction wheels; and tilting and rocking of the holder itself is performed by the operation of a part which extends downwardly from the journaling point of the holder and to which a linking mechanism or a hydraulic device is connected. In such an arrangement, when each holder which holds its hemispherical idler is journaled with respect to the frame of the device, as it is necessary that each of the hemispherical idlers be press-contacted to the friction wheels under the same condition, the shaft which journals the holder should be disposed at an accurate position with the result that assembly and working of the device has been made remarkably difficult. Also, the respective holders need be tilted simultaneously and at the same angle. However, it is all the more difficult to operate the holders which are journaled on separate axes by linking them together.

The holder of the idler is held by the following method: On the bottom of the holder, an arc-shaped tooth portion is formed along the axial direction of the driving shaft, said arc-shaped toothed portion being engaged with a rack-shaped toothed portion along said axial direction, said rack-shaped portion being borne by a seat which is held in a manner that it moves, against the frame, only in said axial direction and not in any other directions and said seat being made, by some suitable means, capable of operating, from outside of the frame, for movements in the axial direction.

By such arrangement, the holder which holds the hemispherical idler would not move as long as the seat is fixed because they are mutually engaged at the toothed portion. If the seat is moved in the axial direction, the rack-shaped toothed portion would move, thereby rolling the arc-shaped toothed portion which is engaged therewith. Accordingly, the holder rolls on the toothed surface of the rack-shaped toothed portion, thereby slanting the shaft of the hemispherical idler which it holds. This means does not require at all a holding shaft for tilting and rocking the holder. Also, in order to dispose the shaft-holding member thus installed at a right position, a high degree of assembling precision has been required in the conventional device. However, by the abovementioned arrangement in the present invention, the assembly precision may be permitted to be somewhat rough. The seat on which the rack-shaped toothed portion is held can be made annular, encircling a pair of friction wheels, hemispherical idler and the holder. In so doing, it becomes possible to provide the rack-shaped toothed portion which engages with the arc-shaped toothed portion of each holder that holds a hemispherical idler at a position corresponding to the arc-shaped toothed portion of the holder in the inner surface of this annular seat. Thus, each of the rack-shaped toothed portions borne by an integrally continuous seat and a plurality of holders can be rolled simultaneously with extreme accuracy.

For these reasons, the afore-described means is very effective for solving various problems as described above. However, it is a difficult problem to hold the holder in a manner such that the holder would correctly rock only in the axial direction when an arc-shaped toothed portion is made on the bottom of the holder for engaging it with the rack-shaped toothed portion of the seat and the holder is caused to tilt and rock by moving the seat in the axial direction.

And, in order to cause the peripheral surface of the tilting hemispherical idler to press-contact with the transmission surface of the friction wheels under the same condition so as not to create slipping on the said transmission surface, when the arcuate toothed portion rocks the holder, it is necessary to add a further contrivance with respect to the construction of the arc-shaped toothed portion. Also, when the seat is formed in an annular shape so as to operate simultaneously a plurality of holders, it is necessary to have a mechanism which is capable of moving the annular seat itself without oscillation.

It is therefore the object of the present invention to provide a means for freely tilting and rocking the holder of the hemispherical idler without journaling the same to the frame.

It is another object of the present invention to provide a mechanism for rolling the holder for accurately press-contacting the peripheral surface of the hemispherical idler with respect to the friction wheel when the holder is rolled and the hemispherical idler is tilted. Such rolling mechanism involves an arc-shaped toothed portion formed at the bottom portion of the holder and a seat which freely moves in the axial direction and possesses another toothed portion to be engaged with the said arc-shaped toothed portion. It is desirable that the arc-shaped toothed portion formed on the holder be formed in concentricity with respect to the peripheral surface of the hemispherical idler.

It is another object of the present invention to provide a supporting mechanism which operates in only the axial direction when the holder supported on the seat rolls on the seat by its movement in the axial direction.

It is still another object of the present invention to provide a means for accurately holding and sliding in the axial direction the seat in an annular form without causing any lag.

The foregoing objects and other objects of the present invention will become more apparent by the following description taken in connection with the accompanying drawing in which like parts are designated by like reference numerals and in which:

FIG. 3 is a perspective view showing the tilting and rocking mechanism of the hemispherical idler; and FIG. 4 is a longitudinal cross-sectional side view showing the hemispherical idler being tilted so as to vary the speed.

Figure 2:
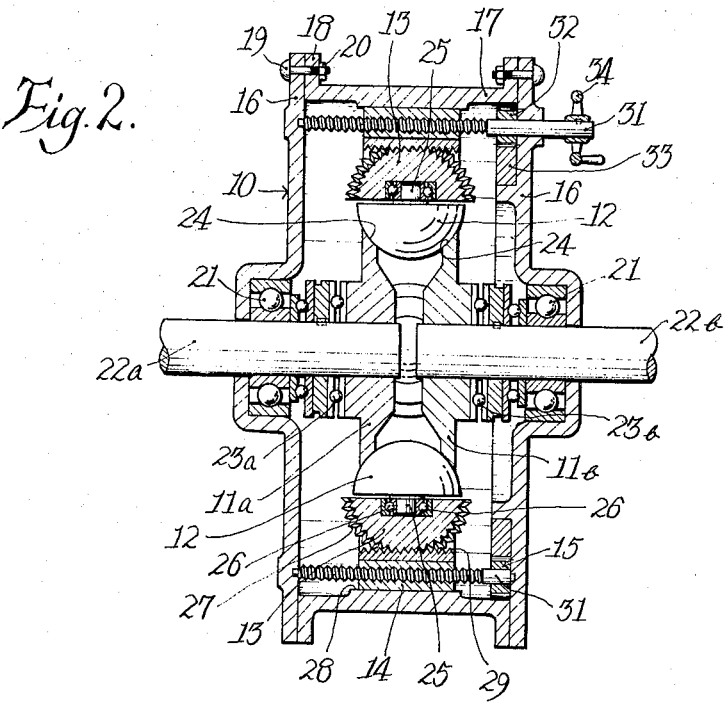
FIG. 2 is a cross-sectional side view of the apparatus illustrated in FIG. 1.

Referring now to FIG. 2 in which the fundamental parts of the present invention are shown, the first part is a frame of the device shown by the reference numeral 10, the second part is a pair of friction wheels 11a and 11b which are journaled at approximately the center of the frame 10 and opposite each other, the third part is a plurality of hemispherical idlers 12, 12 which are provided to simultaneously contact both the said friction wheels and rotate, the fourth part is holders 13, 13 which journal the hemispherical idlers and tilt and rock the axes of the hemispherical idlers, the fifth part is the seat 14 which supports the holders, and which is fixed itself so as to slide freely only in the axial direction with respect to the frame of the device, and which holds the holders 13 in such a manner that the hemispherical idlers 12, 12 may press-contact the friction wheels 11a, 11b, and the sixth part is an operating mechanism 15 which causes the seat 14 to axially slide and which is operable from outside of the frame. The said seat 14 constitutes a holder-rolling mechanism which causes the holder 13 to roll on the seat 14 in relation to the aforementioned holder 13. This holder-rolling mechanism also involves the holding mechanism which concurrently holds the holder 13 in a manner such that it would not move, e.g. roll, in any other direction than the axial direction.

Figure 1:
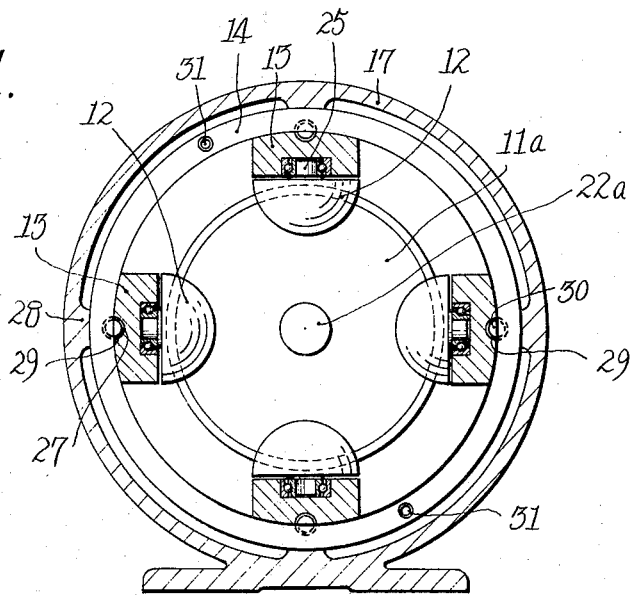
FIG. 1 is a cross-sectional front view of an apparatus constructed in accordance with the present invention.

The frame 10 comprises side walls 16, 16 and encircling wall 17. These parts are assembled integrally by tightening bolts 19 and nuts 20 by way of the flanges 18 which are provided on both edges of the encircling wall 17 and which are fitted to each of the peripheral edges of the side walls 16, 16. Preferably, the inside of the encircling wall 17 is formed, as shown in FIG. 1, in a circle as viewed from the axial direction. By shaping in such a manner, holding of the seat 14 to the frame is made easier. The pair of friction wheels 11a, 11b are wedged by way of thrusting mechanisms 23a, 23b at the ends of a driving shaft 22a and driven shaft 22b journaled to the left and right side walls 16, 16 of the frame 10 by way of bearings 21, 21, respectively. The driving shaft 22a and driven shaft 22b are journaled on the same axial line, and the ends thereof confront each other approximately at the center of the frame 10. The friction wheels 11a, 11b are shaped in the form of a frustum of a cone and, on the peripheral edge thereof, there are provided transmission friction surfaces 24, 24 which incline inwardly.

The plurality of hemispherical idlers 12, 12 are so disposed that the peripheral surfaces of the spherical side thereof may simultaneously press-contact the transmission surfaces of the two friction wheels 11a, 11b at the intermediate position of the said two friction wheels.

And, at the center of the flat side of the hemispherical idler 12, 12 a shaft 25 is installed at right angles thereto. On the shaft 25, a bearing 26 of angular contact form is equipped, which is capable of sustaining two loads, one in the radial direction and the other in the axial direction. Through the medium of this bearing 26, the hemispherical idlers are supported by the holder 13.

On the outer peripheral side of the holder 13, a toothed portion 27 is formed in an arc-shape along the axial direction of the friction wheels 11a, 11b. This arc-shaped toothed portion 27 is preferably formed concentric with the peripheral surface of the spherical idlers 12. The seat 14 is formed in an annular shape, and the size thereof is necessary to be such that its outer peripheral surface is almost identical with the inner surface of the encircling wall 17 of the frame 10 and that the inner peripheral surface is large enough to enclose the friction wheels 11a, 11b, the hemispherical idlers 12, 12 and the holders 13, 13. When inserted in the frame 10, its outer peripheral surface is held on the surface of the seating 28 which is formed on the inner surface of the encircling wall 17 of the frame 10 at a proper interval in a manner so as to be able to freely slide in the axial direction. The way of holding the seat 14 to the frame 10 can be done by some other proper mechanisms, but the above-described means would be the most reliable one. The annular seat 14 need not necessarily be of a cylindrical shape, but of other configurations such as square, etc. when viewed from the axial direction may be acceptable, so far as it is an integrated and continuous whole capable of encircling the friction wheels 11a, 11b, hemispherical idlers 12, 12 and the holders 13, 13.

On the inner peripheral surface of the seat 14, rack-shaped toothed portions 29 are formed along the axial direction at a position where the arc-shaped toothed portions encounter. These rack-shaped toothed portions 29 hold the holders 13 as they are at their own posture, when the seat 14 is fixed, by engagement with the toothed portion 27 of the holder 13. When the seat 14 is moved in the axial direction, it works to cause the holder 13 to roll as well as the axis of the hemispherical idler 12 to tilt. Consequently, the toothed portion 29 must be long enough to cause the shaft 25 of the hemispherical idler 12 to tilt sufficiently for the required variation of the speed. Further, the holder 13 should be fixed to the seat 14, not only in the axial direction of the driving shaft but also in the radial direction thereof. For accomplishing this objective, there would be required another means to stop movement of the holder in the said radial direction, besides the engagement of the toothed portions 27 and 29. As shown in FIG. 3, it is possible to cause the rolling mechanism of the holder to serve simultaneously as the holding mechanism of the holder without further necessity of other mechanisms by forming the toothed portion 27 which constitutes the bottom portion of the holder 13 in a manner as to be depressed in an arc-shape toward the inner part of the holder 13 when viewed from the axial direction of the driving shaft, and, further, by forming the toothed portion 29 formed on the seat 14 into a convex which fits with the afore-described arc-shaped concave toothed portion 27. The toothed portion of such particular shape can be easily obtained by half burying, on the radially inner side of the seat 14, a screw rod 30 having a screw thread around the peripheral surface in such a manner that half of the peripheral threaded surface is exposed as shown in FIG. 3. Also, on the mating side of the holder 13, the toothed portion can be easily obtained by forming the screw hole in a manner as if it were half-cut in the axial direction around the radially outer periphery of the holder.

The mechanism for sliding the seat 14 in the axial direction would operate by forming an appropriate number of screw holes in the axial direction of random positions of the seat 5 and screwing thereinto screw rods 31 and journaling both ends of the screw rods 31 to the side walls 17 of the frame 10 and rotating said screw rods 31. These screw rods 31, 31 have at their ends pinions 32, 32 which are fixed there respectively; these pinions 32 are further linked by a large gear 33 and, if one of them rotates, all the other would rotate simultaneously. These operations are done by projecting beyond the frame 10 one of the screw rods 31 and installing a handle 34 thereupon and rotating the handle 34.

Next, explanation is made hereunder with respect to the functions of this device.

Referring to FIG. 3, if the handle 34 is turned (the direction of rotation is determined by the direction of the thread of the screw rod 31), the screw rod 31 turns and the annular seat 14 is attracted to one side of the frame 10. Such movement is performed accurately in the axial direction, because the outer peripheral surface of the seat 14 is borne by the seating surfaces 28 or the inner peripheral surface of the frame 10, and, moreover, since the outer peripheral surface of the annular seat 14 is supported by the seatings in the inner peripheral surface of the frame and this annular seat 14 is moved by simultaneous rotation of a plurality of screw rods 31, 31 in an interlocked manner which are screw-engaged at symmetrical positions, the said annular seat is moved correctly in the axial direction with the least oscillation. Due to such movement, the holder 13, which is engaged with the toothed portion 29 of the seat 14 at the toothed portion 27, rolls upon the seat 14, and is tilted as shown in the drawing. Since the toothed portion 27 is made to be concentric with the peripheral surface of the hemispherical idler 12, the said hemispherical idler 12 is tilted at its position and the peripheral surface of the hemispherical idler 12 press-contacts with both of the friction wheels 11a, 11b under the same conditions.

Under such conditions, the friction wheel 11a, on the left contacts with the smaller rotational circumference of the hemispherical idler 12, and the friction wheels 11b, on the right side, contacts with the larger rotational circumference with the result that the speed of rotation which is transmitted from the friction wheel 11a on the left side to the friction wheel 11b on the right side by way of the hemispherical idler 12 is remarkably increased. Also, if the handle 34 is turned in the reverse direction, there would be an opposite result to what has been shown in FIG. 3 and the speed transmitted would decrease.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. A friction type continuous speed variation device comprising: a frame, a pair of friction wheels, means supporting the wheels in spaced aligned relation in said frame for rotation about a common axis, said wheels having peripheries which are part-spherically concave, a plurality of hemispherical idlers each of which are adapted for individual rotation, the idlers each being simultaneously in contact with the part-spherical peripheral surfaces of the two friction wheels at a position midway between said pair of friction wheels; a holder for each idler, means supporting each idler from the associated holder for rotation about an axis parallel to said wheels and for common tilting movement with said holder about an axis perpendicular to said wheels, means for tilting and adjusting each of the holders with respect to the frame which in turn tilts the associated hemispherical idler in the peripheral surface of the idler while the idler remains in contact with said pair of friction wheels, the latter means including means supporting each holder such that it is displaceable at its periphery relative to the frame only in the direction of the first said axis, and operating means engaging said means which tilts and adjusts the holders for operating the same, said operating means including a mechanism which is accessible from outside of the frame, said holders each being provided with an arc-shaped toothed portion on the outer peripheral surface thereof on a side opposite the associated hemispherical idler, said means supporting each holder comprising a rack-shaped toothed portion extending in the direction of the first said axis and in toothed engagement with the toothed portion of the associated holder, an annular seat encircling said friction wheels, hemispherical idlers and holders, said rack-shaped toothed portion being supported on the inner surface of said annular seat, said annular seat being supported in the frame for movement only in the direction of the first said axis and being related with said operating means such that by moving said seat by said operating means, each said holder is rolled on said rack-shaped toothed portion and the axis of said hemispherical idler is tilted and adjusted.

2. A device as claimed in claim 1 wherein the arc-shaped toothed portion of each of the holders is concentric with the spherical surface of the associated hemispherical idler and is engaged with the rack-shaped toothed portion provided on the seat.

3. A device as claimed in claim 1 in which the arc-shaped toothed portion of each of the holders is formed with an arcuate concave surface which is directed toward the interior of the holder, said operating means comprising screw rods fixed to the annular seat and extending in the direction of the first said axis at a position where said arcuate concave surface and the peripheral surface substantially coincide, the rack-shaped toothed portion of said seat being inwardly projecting and engaged with said arc-shaped toothed portion of the associated holder.

4. A device as claimed in claim 3 wherein the seat has an outer periphery engaged with the inner peripheral surface of the frame enabling the seat to move only in the direction of said first axis, said annular seat being further provided with a plurality of screw holes extending in the direction of said first axis at symmetrical positions, each being threadably engaged by a corresponding screw rod, said operating means further comprising means engaging the screw rods for simultaneously moving the same thereby enabling the annular seat at the inner peripheral surface of the frame to operate.

5. A device as claimed in claim 1 in which the seat has an outer periphery which is press-contacted on the inner peripheral surface of the frame thus enabling the seat to move in the direction of the first said axis only.

References Cited by the Examiner

UNITED STATES PATENTS

| | | | |
|---|---|---|---|
| 1,878,068 | 9/32 | Berkel | 74—200 |
| 2,126,772 | 8/38 | Haskell | 74—200 X |
| 2,675,713 | 4/54 | Acker | 74—200 X |
| 2,931,235 | 4/60 | Hayward | 74—200 |
| 3,066,544 | 12/62 | Louis | 74—200 |

FOREIGN PATENTS 346,080   6/60   Switzerland.

DON A. WAITE, *Primary Examiner.*